(12) United States Patent
Lindsay

(10) Patent No.: US 7,597,398 B2
(45) Date of Patent: Oct. 6, 2009

(54) VEHICULAR SEAT WITH ADJUSTABLE THIGH SUPPORT

(75) Inventor: Derek Lindsay, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/649,123

(22) Filed: Dec. 31, 2006

(65) Prior Publication Data

US 2008/0157577 A1    Jul. 3, 2008

(51) Int. Cl.
*A47C 3/00* (2006.01)
(52) U.S. Cl. .............................. 297/284.11; 297/284.1; 297/283.2
(58) Field of Classification Search .............. 297/283.2, 297/284.1, 284.11
See application file for complete search history.

(56) References Cited

U.S. PATENT DOCUMENTS

| 4,664,444 | A | | 5/1987 | Murphy | |
|---|---|---|---|---|---|
| 4,678,229 | A | * | 7/1987 | Ryan et al. ..................... | 297/68 |
| 5,588,708 | A | * | 12/1996 | Rykken et al. ............. | 297/423.2 |
| 5,647,635 | A | * | 7/1997 | Aumond et al. ......... | 297/284.11 |
| 5,733,005 | A | * | 3/1998 | Aufrere et al. .............. | 297/340 |
| 5,782,535 | A | * | 7/1998 | Lafer ..................... | 297/423.36 |
| 6,109,693 | A | * | 8/2000 | Bauer et al. ............ | 297/284.11 |
| 6,371,556 | B1 | * | 4/2002 | Arai ........................... | 297/331 |
| 6,375,261 | B1 | * | 4/2002 | Link ............................ | 297/284.11 |
| 6,386,633 | B1 | | 5/2002 | Newton | |
| 6,419,317 | B1 | | 7/2002 | Westrich et al. | |
| 6,454,353 | B1 | | 9/2002 | Knaus | |
| 6,578,915 | B2 | | 6/2003 | Jonas et al. | |
| 6,601,918 | B2 | | 8/2003 | Mattsson | |
| 6,890,030 | B2 | * | 5/2005 | Wilkerson et al. ....... | 297/284.11 |
| 7,093,897 | B2 | * | 8/2006 | Terrand et al. ......... | 297/284.11 |
| 7,108,322 | B2 | * | 9/2006 | Erker .................... | 297/284.11 |
| 7,229,134 | B2 | * | 6/2007 | Ito ........................ | 297/423.26 |
| 2002/0113473 | A1 | * | 8/2002 | Knaus ................... | 297/284.11 |
| 2004/0124683 | A1 | * | 7/2004 | Matsumoto et al. ...... | 297/344.1 |
| 2005/0184569 | A1 | | 8/2005 | Penley et al. | |
| 2005/0264070 | A1 | * | 12/2005 | Kao et al. .............. | 297/284.11 |
| 2007/0132286 | A1 | * | 6/2007 | Taoka et al. .............. | 297/216.1 |

* cited by examiner

*Primary Examiner*—David Dunn
*Assistant Examiner*—James Alex
(74) *Attorney, Agent, or Firm*—Mark E. Duell, Esq.; Emerson, Thomson & Bennett

(57) ABSTRACT

A seat for installation in a vehicle that is adjustable to support an occupant's thighs. The seat includes a generally-horizontal seat frame supporting a seat cushion including a front edge that at least partially extends outwardly beyond the seat frame, a seatback coupled to the seat frame for providing back support to the occupant while seated, and a seat bracket coupled to the seat frame and compatible with a floor bracket supported above a floor of a vehicle cabin for coupling the seat to the vehicle. The seat further includes an adjustable thigh support adjacent to a front portion of the seat cushion. The thigh support includes a spool coupled to the seat frame that can be adjusted relative to the seat frame between a retracted position and an extended position, wherein the front edge of the seat cushion is at least partially wrapped around the spool while the spool is in the retracted position, and the front edge of the seat cushion is at least partially unwrapped from around the spool while the spool is in the extended position.

16 Claims, 3 Drawing Sheets

VEHICULAR SEAT WITH ADJUSTABLE THIGH SUPPORT

BACKGROUND OF THE INVENTION

1. Field of the Invention

The present invention is directed generally to a vehicular seat, and more particularly to a vehicular seat with an adjustable thigh support.

2. Description of Related Art

A traditional automobile seat includes a generally horizontal seat base and a seatback coupled to the seat base at an obtuse angle for supporting an occupant of the automobile in a seated posture. The occupant of the automobile sits, facing a forward direction, upon a cushion provided to pad the seat base with his feet resting on the floor and his legs extending outward beyond the cushion. The seat can optionally be provided with a mechanism for horizontally adjusting the position of the seat relative to the floor of the automobile, as well as a mechanism for adjusting the angle between the seatback and the seat base.

A tall occupant having long legs will typically adjust the position of the seat toward a rear of the automobile to enlarge the leg room between a front portion of the seat cushion and a forward barrier of the automobile cabin. Doing so allows the tall occupant to extend his legs as much as possible to enhance his comfort while riding in the automobile. By extending his legs, the tall occupant also allows his thighs to rest somewhat flat on the seat cushion, thereby providing support to the tall occupant's thighs. However, the longitudinal length of conventional seat cushions is insufficient to extend beneath the entire length of the tall occupant's thighs, causing them to extend unsupported beyond a front portion of the seat cushion.

Similarly, an automobile seat tailored to provide thigh support to a tall occupant causes discomfort to a short vehicle occupant. In such cases, the longitudinal length of the seat cushion extends too far forward beneath the short occupant's thighs and even beneath the knee of the short occupant. Thus, while seated, the short occupant can not bend his legs at a suitable angle to allow his feet to rest on the floor of the automobile's cabin.

Previous attempts to devise a vehicular seat to accommodate occupants of varying heights have focused on allowing adjustment of the longitudinal length of the seat cushion. To this end, the front portions of said seats have been made adjustable, independent of the remainder of the seat cushion. The occupant can manually adjust the position of the front portion relative to the seat cushion, thereby providing thigh support where needed. However, such a configuration leaves a gap between the adjustable front portion and the rest of the seat cushion, making the occupant uncomfortable while seated in the seat.

Other attempts have focused on allowing adjustment of the seat cushion as a whole, undivided structure. Such configurations allow for rotation of the front portion about an axis such that said rotation elevates or lowers the front portion of the seat cushion as desired. Although this does provide support to the occupant's thighs, it limits the occupant's ability to extend his legs (i.e., establish an angle between the thigh and calf to an angle approaching 180°) while still allowing his feet to rest on the floor of the automobile's cabin.

Yet other attempts have been made to allow for manual adjustment of the front portion of the seat cushion as a whole, undivided structure in a plane of the seat cushion, while preventing the formation of a gap between the adjustable portion and the seat cushion. Such a configuration typically employs a sliding seat base support that underlies the padding of the seat cushion. The seat base can be slid forward or rearward with respect to the vehicle, causing the front portion of the seat to extend or retract, respectively. However, when the adjustable seat base is in a retracted position the excess seat cushion hangs freely toward the floor of the vehicle, creating an unsightly appearance and an obstacle limiting access to the underside of the seat.

Alternate adjustable thigh supports also allow an underlying member to be horizontally adjusted relative to the seat cushion to adjust the thigh support provided to the seat's occupant. Although such configurations coil the excess seat-cushion material to prevent it from hanging freely, these configurations utilize a complex system of compatible gears to adjust the length of the seat cushion and hold it in place when adjustment is not desired. And in addition to being complex, the gear system requires the seat's occupant to manually turn the interlocking gears, making adjustment slow and cumbersome.

Accordingly, there is a need in the art for a vehicular seat having an adjustable thigh support that is easy to use and accommodates occupants of varying heights. The vehicular seat can minimize the excess cushion material that hangs freely when the thigh support is in a retracted position, and can be readily adjusted from a retracted position to an extended position.

BRIEF SUMMARY OF THE INVENTION

According to one aspect, the present invention provides a seat for installation in a vehicle that is adjustable to support an occupant's thighs. The seat includes a generally-horizontal seat frame supporting a seat cushion including a front edge that at least partially extends outwardly beyond the seat frame, a seatback coupled to the seat frame for providing back support to the occupant while seated, and a seat bracket coupled to the seat frame and compatible with a floor bracket supported above a floor of a vehicle cabin for coupling the seat to the vehicle. The seat further includes an adjustable thigh support adjacent to a front portion of the seat cushion. The thigh support includes a spool coupled to the seat frame that can be adjusted relative to the seat frame between a retracted position and an extended position, wherein the front edge of the seat cushion is at least partially wrapped around the spool while the spool is in the retracted position, and the front edge of the seat cushion is at least partially unwrapped from around the spool while the spool is in the extended position.

According to another aspect, the present invention provides a vehicle for transporting one or more occupants, the vehicle including a plurality of wheels for transporting the vehicle over a ground surface; an engine for providing a driving force for rotating at least one of the wheels; a passenger cabin defined by a plurality of doors and windows; and a seat that is adjustable to support an occupant's thighs. The seat includes a generally-horizontal seat frame supporting a seat cushion including a front edge that at least partially extends outwardly beyond the seat frame, a seatback coupled to the seat frame for providing back support to the occupant while seated, and an adjustable thigh support adjacent to a front portion of the seat cushion. The thigh support includes a spool coupled to the seat frame that can be adjusted relative to the seat frame between a retracted position and an extended position, wherein the front edge of the seat cushion is at least partially wrapped around the spool while the spool is in the retracted position, and the front edge of the seat cushion is at least partially unwrapped from around the spool while the spool is in the extended position.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1:
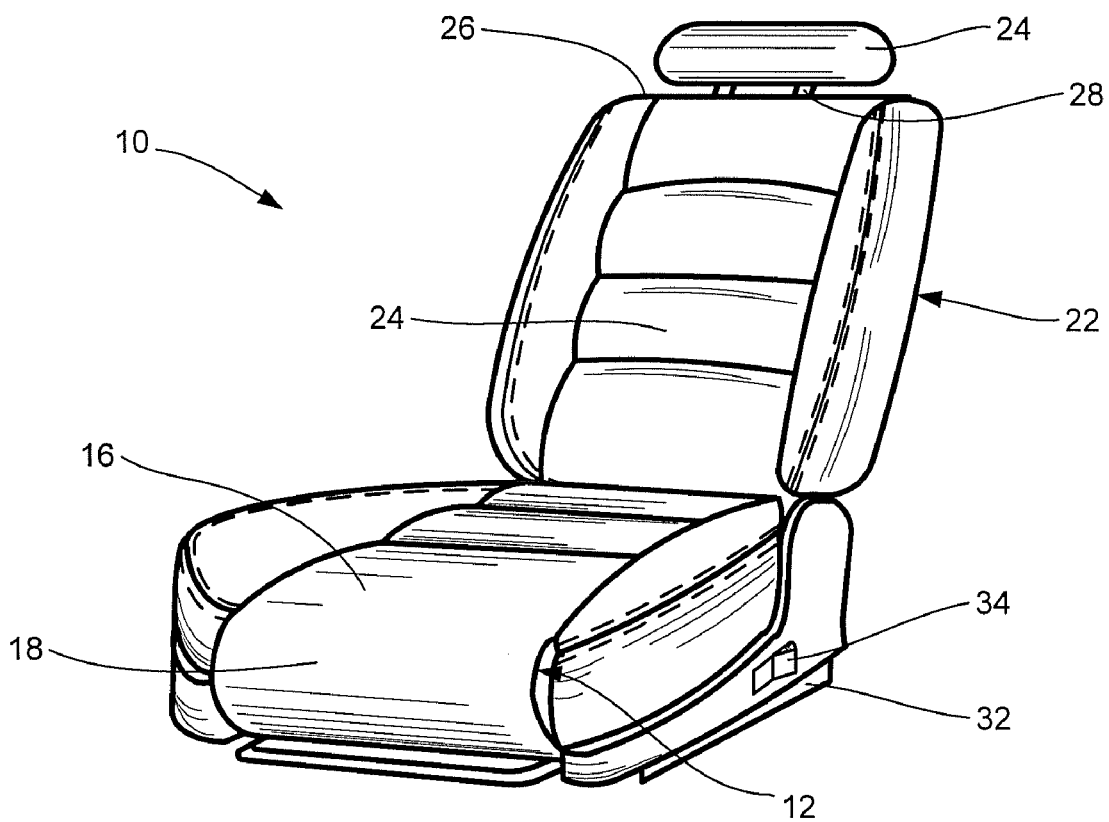
FIG. 1 is a perspective view of a seat for installation in a vehicle in accordance with an aspect of the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

FIG. 1 shows a seat 10 for installation in a vehicle including an adjustable thigh support 12 for supporting the thighs of a plurality of occupants having different heights. As shown, a generally-horizontal seat frame 14 is supporting a seat cushion 16 including a front edge 18 that at least partially extends outwardly beyond the seat frame 14. The seat frame 14 (shown best in FIGS. 5 and 6) can be any generally-rigid structure that can provide support to the seat cushion 16 and support the weight of an occupant seated there on. For example, the seat frame 14 can be a seat pan comprising a solid, contoured metallic plate disposed within the seat cushion. Other embodiments include a seat frame 14 with a peripheral metallic element forming a rectangular loop, and flexible support members 62 spanning the interior of the rectangular loop between different portions of the peripheral element.

A seatback 22 is coupled to the seat frame 14 for providing back support to the occupant while seated on the seat 10 within the vehicle. The seatback 22 can include a rigid frame member (not shown) that is at least partially encased by padding 24 to cushion the impact between the occupant and the seatback 22 as the occupant leans back against the seatback 22 while in a seated posture. Optionally, the seatback 22 can be pivotally coupled to the seat frame 14 to form an adjustable obtuse angle relative to the generally-horizontal seat frame 14. In this manner, the occupant can pivotally adjust the seatback, either manually or via an electrical actuator, to establish a desirable recline angle for receiving and supporting the occupant.

An optional headrest 24 can be coupled to the seatback 22 to extend above an upper portion 26 of the seatback 22 to impede motion of the occupant's head in a rearward direction if subjected to a rearward biasing force, such as when the vehicle is rear ended by another vehicle, or when the vehicle accelerates forward. The headrest 24 can be a padded member supported above the upper portion 26 of the seatback 22 by a metallic frame 28. The distance between the headrest 24 and the upper portion 26 of the seatback 22 can be adjusted within a predetermined range by the occupant to be located adjacent to the occupant's head while the occupant is seated in the seat 10. Embodiments of the invention can include at least one of a telescopically extendable headrest 24, a hydraulically-actuated headrest 24, and the like.

A seat bracket 32 coupled to the seat frame 14 is cooperable with a floor bracket adjacent to the floor of the vehicle's cabin to support the seat 10 above the floor within the vehicle. The seat 10 and floor brackets can be any cooperable brackets that can couple the seat 10 to the vehicle and allow adjustment of the seat 10 relative to the floor in a forward direction generally towards a dashboard of the vehicle, and in a rearward direction generally toward a rear seat or tail section of the vehicle. The seat bracket 32 can include a track secured to the seat frame 14 in a longitudinal direction parallel with a direction in which the seat position can be adjusted. A floor bracket that is a compatible longitudinally-extending track can support a set of bearings that can ease relative motion of the seat 10 relative to the floor of the vehicle.

For manually-adjustable seat positions, an arm (not shown) that is operable to permit relative adjustment of the seat to the floor of the vehicle's cabin extends outwardly from beneath the seat cushion 16 to a location where it can be grasped by the occupant. The arm includes a locking member that can releasably prevent translation of the seat 10 relative to the floor of the vehicle to hold the seat 10 in place when adjustment is not desired. When adjustment of the seat position is desired, the occupant can grasp the arm and position it such that the locking member does not interfere with translation of the seat 10 relative to the floor. Once the desired seat-position adjustment is complete, the arm can be released so that the locking member can once again maintain the position of the seat 10 relative to the floor of the vehicle.

Other embodiments of the present invention include a seat bracket 32 that can cooperate with a floor bracket coupled to an electrical actuation mechanism (not shown), allowing the occupant to adjust the seat position relative to the cabin floor via an electric motor. The occupant can control operation of the electric motor by manipulating a button 34, joystick, or other input device to activate an electric motor that mechanically adjusts the position of the seat 10 within the cabin of the vehicle.

Figure 5:
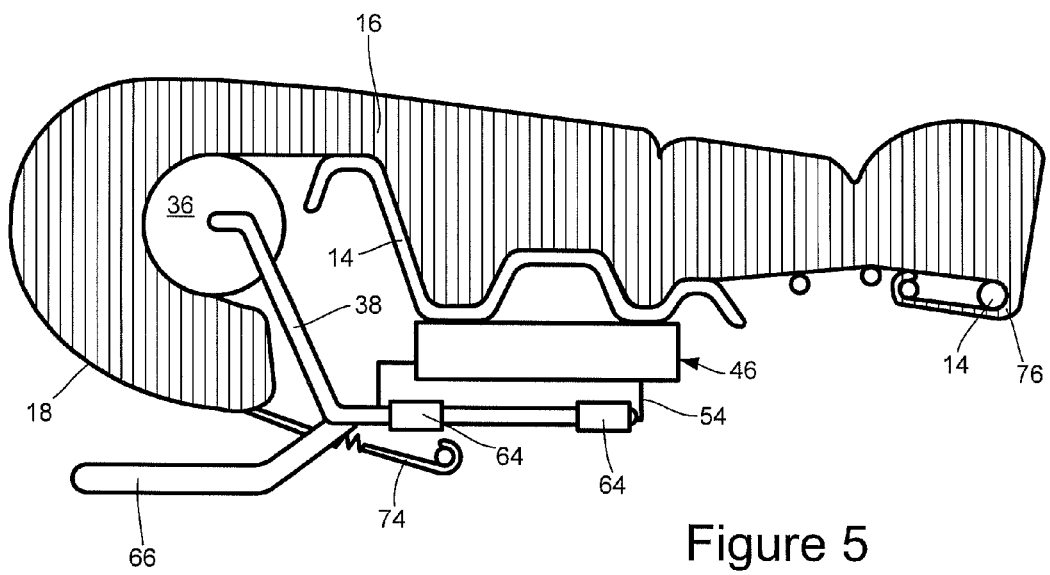
FIG. 5 is a cutaway view of a horizontal portion of a seat provided with an adjustable thigh support to be installed in a vehicle, wherein a spool of the thigh support is shown in a retracted position.
Figure 6:
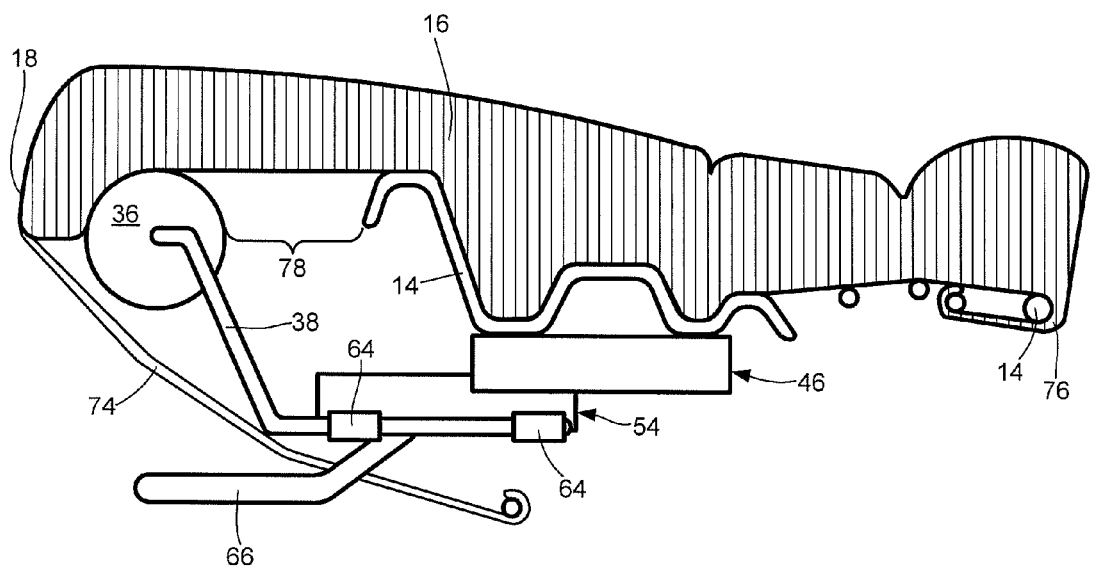
FIG. 6 is a cutaway view of a horizontal portion of a seat provided with an adjustable thigh support to be installed in a vehicle, wherein a spool of the thigh support is shown in an extended position.

The seat 10 is also provided with an adjustable thigh support 12 adjacent to a front portion 18 of the seat cushion 16. The position of the thigh support 12 can be adjusted relative to the seat cushion 16 upon which the occupant is to sit, thereby supporting the thighs of occupants having a range of heights. As shown in FIGS. 1, 5 & 6, the front portion 18 of the seat cushion 16 extends beyond the seat frame 14 and also extends beyond a spool 36 forming a portion of the thigh support 12. In this manner the seat cushion 16 appears as an uninterrupted surface spanning both the seat frame 14 and the thigh support 12.

Figure 2:
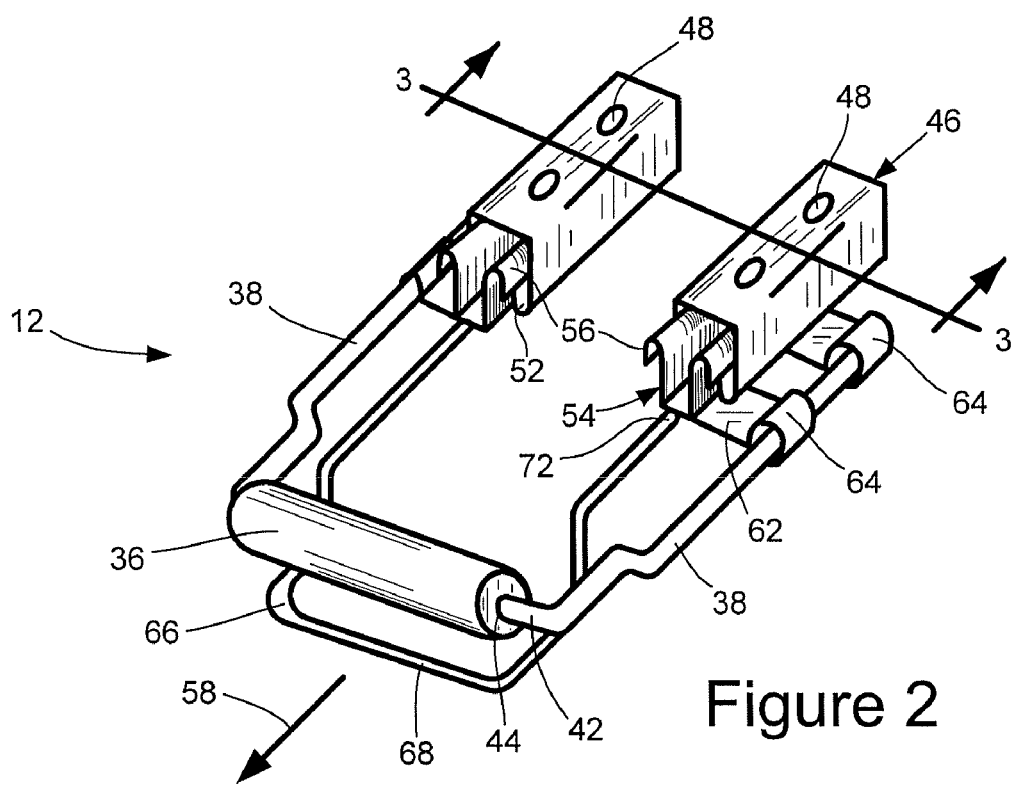
FIG. 2 is a perspective view of a thigh-support assembly to be coupled to a seat for installation in a vehicle, wherein a spool of the thigh support is in a retracted position.

FIG. 2 offers a perspective view of the thigh-support 12 with the spool 36 in a retracted position. The spool 36 is coupled to the seat frame 14 by a pair of rigid arms 38, one to extend outwardly from beneath the seat cushion 16 on each side of the spool 36. Each arm 38 can include a transversely-extending portion 42 at a terminal end adjacent to the spool 36 to extend at least partially into an interior passage 44 of the spool 36, thereby supporting the spool 36 at the terminal end of each arm 38. Alternate embodiments include a transversely-extending shaft extending entirely through the spool 36 between each arm 38. The spool 36 can optionally be rotatable about an axis of the transversely-extending portion 42 of each arm 38 or of the shaft extending through the spool 36 to take up or release excess seat-cushion 16 material as the position of the spool 36 is adjusted, as discussed below.

According to the embodiment shown in FIG. 2, an upper rail 46 is to be secured to an underside of the seat frame 14 with any type of fastener such as a screw, bolt, rivot or other type of mechanical fastener that can extend though apertures 48 in the upper rail 46 to secure the upper rail 46 to the seat frame 14. Alternate embodiments include an upper rail 46 that is welded to the seat frame 14, or affixed thereto via any other fastening mechanism. The upper rail 46 has a cross section that generally resembles a "C" shape, shown in FIG. 3, turned to orient the opening downward, away from the seat frame 14 when coupled thereto. An inward flange 52 is formed adjacent to each terminal end of the generally C-shaped upper rail 46 to define a track limiting the allowable range of motion of the spool 36 relative to the seat cushion 16. The inward flanges 52 can be formed by bending a portion of the upper rail 46 over on itself, by welding another metallic component to the upper rail 46, and the like.

Figure 3:
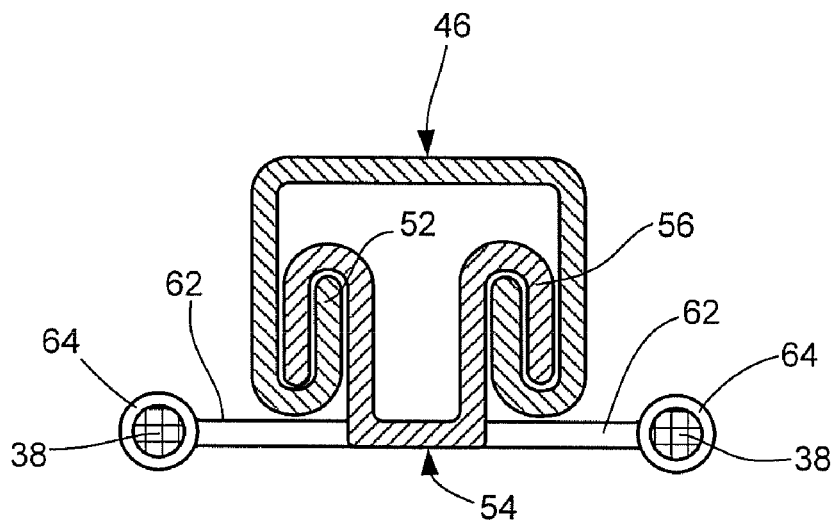
FIG. 3 is a cross-sectional view taken along line 3-3 in FIG. 2.

A lower rail 54 also having a generally C-shaped cross section with its opening oriented upwardly is also shown in FIGS. 2 and 3. The lower rail 54 includes an outward flange 56 adjacent to each terminal end of its C-shaped cross section. Similar to the inward flanges 52 of the upper rail 46, the outward flanges 56 can be formed by bending a portion of the lower rail 54 over on itself, by welding another metallic component to the lower rail 54, and the like. However, unlike the inward flanges 52 of the upper rail 46, the outward flanges 56 are formed externally of the C-shaped cross section of the lower rail 54 instead of internally of the C-shaped cross section, as in the case of the upper rail 46.

The lower rail 54 can be received within the upper rail 46 in a telescopic arrangement to facilitate movement of the lower rail 54 relative to the upper rail 46. The outward flanges 56 of the lower rail 54 can be received between the inward flanges 52 of the upper rail 46 and the upper rail 46 itself to guide translational movement of the lower rail 54 in a longitudinal direction indicated by the arrow 58 in FIG. 2. One or more sets of bearings such as ball bearings can optionally be provided between the upper and lower rails 46, 54 to ease the relative motion thereof.

Each of the arms 38 supporting the spool 36 are coupled to the lower rail 54 to transmit translational motion of the lower rail 54 relative to the upper rail 46 to the spool 36, thereby adjusting the position of the spool 36 relative to the seat frame 14. To couple the arms 38 to the lower rails 54, one or more support members 62 can extend from each lower rail 54 to secure the arms 38 thereto. A clamp 64 or other fastener can be provided to the end of each support member 62 to couple the arms 38 to the support members 62. Alternately, the arms 38 can be welded to the support members 62, or otherwise coupled thereto. The support members 62 extend from the lower rail 54 beneath the inward flanges 52 of the upper rails 46 to minimize interference therebetween.

Figure 4:
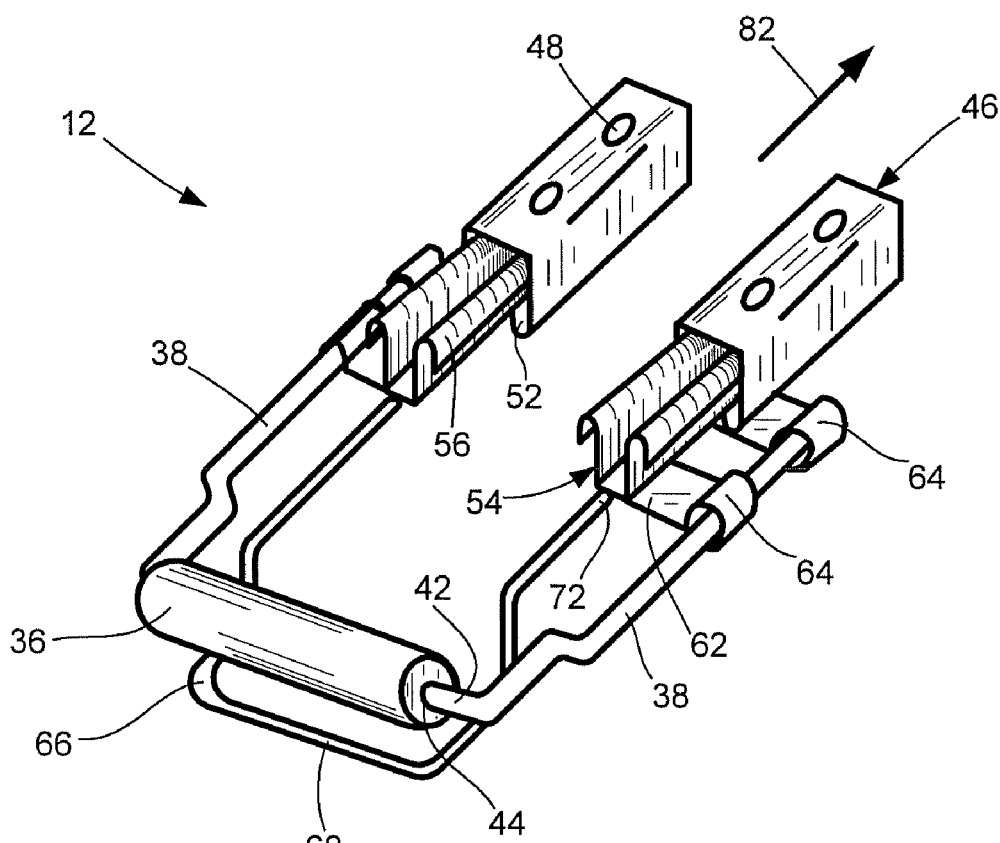
FIG. 4 is a perspective view of a thigh-support assembly to be coupled to a seat for installation in a vehicle, wherein a spool of the thigh support is in an extended position.

FIG. 4 offers a perspective view of the thigh-support 12 with the spool 36 in an extended position. With the spool 36 adjusted to the extended position, the lower rail 54 is telescopically removed from within the upper rail 46. This, in turn, moves the support members 12, arms 38 and the spool 36 in a generally-forward direction away from the seat frame 14.

Although the embodiments described above include a set of interlocking rails 46, 54 with a lower rail 54 being telescopically adjustable relative to a fixed upper rail 46, the present invention also encompasses a combination of a fixed lower rail 54 and an adjustable upper rail 46. Further, any arrangement of inward and outward flanges 52, 56 can be provided to each of the upper and lower rails 46, 54 to form a compatible set to guide the motion of at least one of the upper and lower rails 46, 54 relative to the other. The concept pervading each of these alternate embodiments is that a feature is provided to the thigh support 12 to permit adjustment of the spool's position relative to the seat frame 14.

An unlocking handle 66 that is operable to selectively disable a locking mechanism can be seen in FIGS. 2 and 4. The unlocking handle 66 is shown as a generally-cylindrical rod rounded to form corners leading to a transverse bar 68 to be gripped by the occupant when adjustment of the spool position is desired. The locking mechanism (not shown) can include any structure that can maintain the relative position of the upper and lower rails 46, 54 when adjustment of the spool's position is not desired. For example, the locking mechanism can be a pin that extends at least partially through an aperture formed in each of the upper and lower rails 46, 54, or the locking mechanism can be one or more teeth extending downwardly from an outward flange 56 of the lower rail 54 to interact with a compatible feature provided to the upper rail 46. Other embodiments include a set of interlocking teeth, or any other mechanical feature that can cooperate with at least one of the upper and lower rails 46, 54 to prevent relative adjustment thereof.

The unlocking handle 66 can be coupled to the locking mechanism adjacent to a proximate end 72 of the unlocking handle 66. Lifting the unlocking handle 66, for example, can serve to disengage the locking mechanism from a compatible feature maintaining the relative position of the upper and lower rails 46, 54. For instance, for the embodiment including teeth extending downwardly from the outward flanges 56 of the lower rail 54, lifting the unlocking handle 66 will remove those teeth from compatible recesses or apertures provided to the inward flanges 52 of the upper rail 46. In this manner, the position of the lower rail, and accordingly the spool 36, can be adjusted relative to the upper rail 46. Once the desired adjustment of the spool's position is complete, the unlocking handle 66 can be released and returned to its unbiased position, thereby reengaging the locking mechanism to once again maintain the relative position of the upper and lower rails 46, 54 in their newly-adjusted position.

FIG. 5 offers a cutaway view of a side of the seat 10 with a side panel removed, wherein the spool 36 is in a retracted position. An occupant can be received in a seated posture within the seat, with his back resting against the seatback 22 and his legs extending forwardly beyond the front edge 18 of the seat cushion 16. For a tall occupant 16 whose legs extend well beyond the front edge 18 of the seat cushion, it is desirable to adjust the spool 36 forward to provide support to the occupant's thighs adjacent to the occupant's knees, thereby enhancing the occupant's comfort while seated.

With the spool 36 in the retracted position, the spool 36 is located relatively close to the seat frame 14, and thus a significant portion of the seat cushion's front edge 18 extends beyond, and is at least partially wrapped around the spool 36. A cushion biasing device 74 such as: a substantially-elastic band extending between a portion of the seat frame 14 and the front edge 18 of the seat cushion 16, a plate (not shown)

having a naturally-coiled shape embedded within the front portion 18 of the seat cushion 16, or any other resilient device that can bias the front edge 18 of the seat cushion 16 generally around the spool 36 can optionally be provided to minimize the amount of seat-cushion material freely hanging from the spool 36 while the spool 36 is in the retracted position.

The seat cushion 16 can optionally be installed over the seat frame 14 by stretching a rear edge 76 of the seat-cushion 16 about a horizontal portion of the seat frame 14 and coupling the rear edge 76 of the seat cushion 16 to a portion of the seat frame 14. Likewise, the front edge 18 is pulled over the spool 36 to a similar horizontal member of the seat frame 14. The tension of the seat cushion 16 and coupled between the two horizontal members of the seat frame 14 can be adjusted as desired by varying the length of the seat cushion 16 to be stretched between the two horizontal members of the seat frame 14.

To adjust the position of the spool 36, and accordingly the depth of the seat 10, to support the thighs of a tall occupant, the occupant can grasp the unlocking bar 68 and pull it in an upward direction generally toward the occupant in the seat 10 to temporarily disable the locking mechanism. Once the locking mechanism is disabled, the occupant can pull on the unlocking bar 68, which is coupled to the lower rail 54 in FIG. 5, in the direction of the arrow 58, to cause translation of the lower rail 54 in a forward direction relative to the upper rail 46. This translational motion is transmitted to the spool 36 by the arms 38, thereby causing the spool 36 to move forward generally in the direction of the arrow 58. As the spool 36 moves forward, the spool 36 can rotate in a clockwise direction as shown in FIG. 5, thereby unwrapping the necessary length of the seat cushion's front edge 18 from around the spool 36 to span the void 78 between the spool 36 and the seat frame 14 while the spool 36 in the extended position, which is shown in FIG. 6. In other words, the length of the seat cushion 36, including the portion of the front edge unwrapped from the spool 36 is sufficient to bridge the gap 78 between the spool 36 and the seat frame 14, thereby forming a generally continuous, elongated seat cushion 16 to provide enhanced thigh support 12 to the tall occupant while seated. The coiling tension on the seat cushion's front edge 18 that biases the front edge 18 about the spool 36 is maintained, and even increased relative to the tension on the front edge 18 while the spool 36 is in the retracted position, by the elastic member 74, which is stretched when at least a portion of the seat cushion's front edge 18 to uncoil from the spool 36.

To return the spool 36 to the retracted position, the unlocking bar 68 is again pulled upward, but it is now pushed inward generally toward a rear of the vehicle in a direction indicated by arrow 82 in FIG. 4. While being moved from the extended position to the retracted position, the spool 36 can rotate in a counterclockwise direction as shown in FIG. 6, thereby causing excess seat cushion 16 material at the front edge 18 to be wrapped at least partially around the spool 36. The elastic band 74 or other cushion biasing device 74 applies the force required to wrap the excess front edge 18 of the seat cushion 16 at least partially around the spool 36 as the spool 36 is adjusted to the retracted position. Following completion of the adjustment to the desired retracted position, the locking bar 68 can be released by the occupant, once again causing the locking mechanism to maintain the relative position of the upper and lower rails 46, 54, thereby preventing further movement of the spool 36 relative to the seat frame 14.

It is worth noting that the spool 36 of the present invention is not limited to adjustment between the fully extended position and the fully retracted position, but can also be adjusted to a plurality of positions therebetween. Further, embodiments of the present invention include an infinitely-adjustable spool 36, meaning that the spool 36 need not be adjusted to one of a predetermined number of allowable adjustment positions.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A seat for installation in a vehicle that is adjustable to support an occupant's thighs comprising:
   a generally-horizontal seat frame supporting a seat cushion including a front edge that at least partially extends outwardly beyond the seat frame;
   a seatback coupled to the seat frame for providing back support to the occupant while seated;
   a seat bracket coupled to the seat frame and compatible with a floor bracket supported above a floor of a vehicle cabin for selectable adjustment of the seat generally towards a front of the vehicle and generally towards a rear of the vehicle relative to the floor of the cabin; and,
   an adjustable thigh support adjacent to a front portion of the seat cushion, the thigh support comprising:
   (1) a spool coupled to the seat frame that can be adjusted relative to the seat frame between a retracted position and an extended position, wherein the front edge of the seat cushion is at least partially wrapped around the spool while the spool is in the retracted position, and the front edge of the seat cushion is at least partially unwrapped from around the spool while the spool is in the extended position, and wherein the spool has an interior passage;
   (2) a track comprising:
      (a) a first rail coupled to the spool, wherein the first rail has a C-shaped cross section and first and second outward flanges;
      (b) a second rail fixedly attached to the seat frame, wherein the second rail has a C-shaped cross section and first and second inward flanges,
      (c) wherein the first outward flange is positioned between the first inward flange and a first inside surface of the second rail and the second outward flange is positioned between the second inward flange and a second inside surface of the second rail; and
      (d) wherein translation of the first rail relative to the second rail slidably adjusts the spool between the retracted and extended positions;
   (3) a rigid first arm that: couples the first rail to the spool; and, supports the spool, the rigid first arm comprising:
      (a) a first end extending at least partially into a first end of the interior passage of the spool, wherein the first end of the rigid first arm is operatively connected to the spool; and
      (b) a second end fixedly attached to the first rail;
   (4) a rigid second arm that: couples the first rail to the spool; and, supports the spool, the rigid second arm comprising:
      (a) a first end extending at least partially into a second end of the interior passage of the spool, wherein the first end of the rigid second arm is operatively connected to the spool; and
      (b) a second end fixedly attached to the first rail;

(5) a locking member comprising at least one protrusion, wherein the protrusion operatively connects to the first rail and at least partially extends into a recess in the second rail for maintaining the spool in at least one of the retracted position, the extended position, and any position between the retracted position and the extended position;

(6) an adjustment member operable to release the locking member by at least partially removing the protrusion from the recess in the second rail, wherein the adjustment member slidably adjusts the spool between the retracted and extended positions and any position between the retracted position and the extended position; and, (7) a force generating biasing device that: (a) biases the front edge of the seat cushion towards wrapping around the spool; (b) biases the spool towards the retracted position; (c) generates a greater biasing force when the spool is in the extended position compared to when the spool is in the retracted position; (d) has a first portion that is operatively connected to the seat cushion; and (e) has a second portion that is fixed with respect to the seat frame.

2. The seat of claim 1, wherein:
the spool further comprises a shaft extending through the interior passage of the spool;
the first end of the first arm is operatively connected to a first end of the shaft; and,
the first end of the second arm is operatively connected to a second end of the shaft.

3. The seat of claim 2, wherein the track further comprises:
a first set of ball bearings positioned between the first rail and the second rail.

4. The seat of claim 1 wherein the seatback is pivotally coupled to the seat frame.

5. The seat of claim 4 wherein the seatback pivotally adjusts to a plurality of positions forming an obtuse angle relative to the seat frame.

6. The seat of claim 1 further comprising:
a headrest coupled to the seatback, wherein the headrest extends at least partially above an upper portion of the seatback.

7. The seat of claim 6 wherein the headrest adjusts within a range of distances from the upper portion of the seatback.

8. The seat of claim 1 wherein the force generating biasing device is a resilient member.

9. The seat of claim 1 wherein the force generating biasing device is an elastic band.

10. A seat for installation in a vehicle that is adjustable to support an occupant's thighs comprising:
a generally-horizontal seat frame supporting a seat cushion including a front edge that at least partially extends outwardly beyond the seat frame;
a seatback coupled to the seat frame for providing back support to the occupant while seated;
a seat bracket coupled to the seat frame and compatible with a floor bracket supported above a floor of a vehicle cabin for selectable adjustment of the seat generally towards a front of the vehicle and generally towards a rear of the vehicle relative to the floor of the cabin; and,
an adjustable thigh support adjacent to a front portion of the seat cushion, the thigh support comprising:
(1) a spool coupled to the seat frame that can be adjusted relative to the seat frame between a retracted position and an extended position, wherein the front edge of the seat cushion is at least partially wrapped around the spool while the spool is in the retracted position, and the front edge of the seat cushion is at least partially unwrapped from around the spool while the spool is in the extended position, and wherein the spool has an interior passage;

(2) a track comprising:
(a) a first rail coupled to the spool, wherein the first rail has a C-shaped cross section and first and second outward flanges;
(b) a second rail fixedly attached to the seat frame, wherein the second rail has a C-shaped cross section and first and second inward flanges,
(c) wherein the first outward flange is positioned between the first inward flange and a first inside surface of the second rail and the second outward flange is positioned between the second inward flange and a second inside surface of the second rail; and
(d) wherein translation of the first rail relative to the second rail slidably adjusts the spool between the retracted and extended positions;

(3) a first arm that: couples the first rail to the spool; and, supports the spool, the first arm comprising:
(a) a first end operatively connected to the spool; and
(b) a second end attached to the first rail;

(4) a second arm that: couples the first rail to the spool; and, supports the spool, the second arm comprising:
(a) a first end operatively connected to the spool; and
(b) a second end attached to the first rail;

(5) a locking member comprising at least one protrusion, wherein the protrusion operatively connects to the first rail and at least partially extends into a recess in the second rail for maintaining the spool in at least one of the retracted position, the extended position, and any position between the retracted position and the extended position;

(6) an adjustment member operable to release the locking member by at least partially removing the protrusion from the recess in the second rail, wherein the adjustment member slidably adjusts the spool between the retracted and extended positions and any position between the retracted position and the extended position; and, (7) a force generating biasing device that: (a) biases the front edge of the seat cushion towards wrapping around the spool; (b) biases the spool towards the retracted position; (c) generates a greater biasing force when the spool is in the extended position compared to when the spool is in the retracted position; (d) has a first portion that is operatively connected to the seat cushion; and (e) has a second portion that is fixed with respect to the seat frame.

11. The seat of claim 10 wherein the seatback is pivotally coupled to the seat frame.

12. The seat of claim 11 wherein the seatback pivotally adjusts to a plurality of positions forming an obtuse angle relative to the seat frame.

13. The seat of claim 10 further comprising:
a headrest coupled to the seatback, wherein the headrest extends at least partially above an upper portion of the seatback.

14. The seat of claim 13 wherein the headrest adjusts within a range of distances from the upper portion of the seatback.

15. The seat of claim 10 wherein the force generating biasing device is a resilient member.

16. The seat of claim 10 wherein the force generating biasing device is an elastic band.

* * * * *